United States Patent
Horii et al.

[11] Patent Number: 5,088,968
[45] Date of Patent: Feb. 18, 1992

[54] POWER TRANSMISSION FOR DRIVING VEHICLE

[75] Inventors: Yasuyuki Horii; Seiichi Takahashi; Takeshi Imamura, all of Osaka, Japan

[73] Assignee: Kubota Ltd., Osaka, Japan

[21] Appl. No.: 505,727

[22] Filed: Apr. 5, 1990

[30] Foreign Application Priority Data

Apr. 14, 1989 [JP] Japan .............................. 1-95488
Oct. 18, 1989 [JP] Japan ............................ 1-272671
Nov. 13, 1989 [JP] Japan ............................ 1-295697

[51] Int. Cl.⁵ ......................................... F16H 47/00
[52] U.S. Cl. ................................. 475/124; 475/121; 475/128; 475/140
[58] Field of Search ............... 475/121, 122, 124, 128, 475/140, 311

[56] References Cited

U.S. PATENT DOCUMENTS

| | | | |
|---|---|---|---|
| 2,177,872 | 10/1939 | Dunn | 475/124 |
| 2,238,746 | 4/1941 | Neracher et al. | 475/122 X |
| 2,806,387 | 9/1957 | Förster et al. | 475/121 |
| 3,082,647 | 3/1963 | Banker | 475/140 |
| 3,164,036 | 1/1965 | Lamburn et al. | 475/128 |
| 3,260,331 | 7/1966 | Borman, Jr. | 475/140 X |
| 3,308,686 | 3/1967 | Magg et al. | 475/121 |
| 3,466,947 | 9/1969 | Smith | 475/140 |
| 4,528,872 | 7/1985 | Umemoto et al. | 74/781 R |

Primary Examiner—Leslie A. Braun
Assistant Examiner—Benjamin Levi

[57] ABSTRACT

A power transmission for driving a vehicle wherein a high-low speed changer is disposed between an engine and a primary speed change mechanism. The speed changer comprises a planetary gear mechanism provided between an input shaft and an output shaft, a speed increasing clutch for causing the gear mechanism to effect a speed increase, and a direct coupling clutch for coupling the input shaft to the output shaft via the gear mechanism without speed change. Since the torque transmitted to the speed change mechanism is small, the transmission can be compact in its entirety.

12 Claims, 8 Drawing Sheets

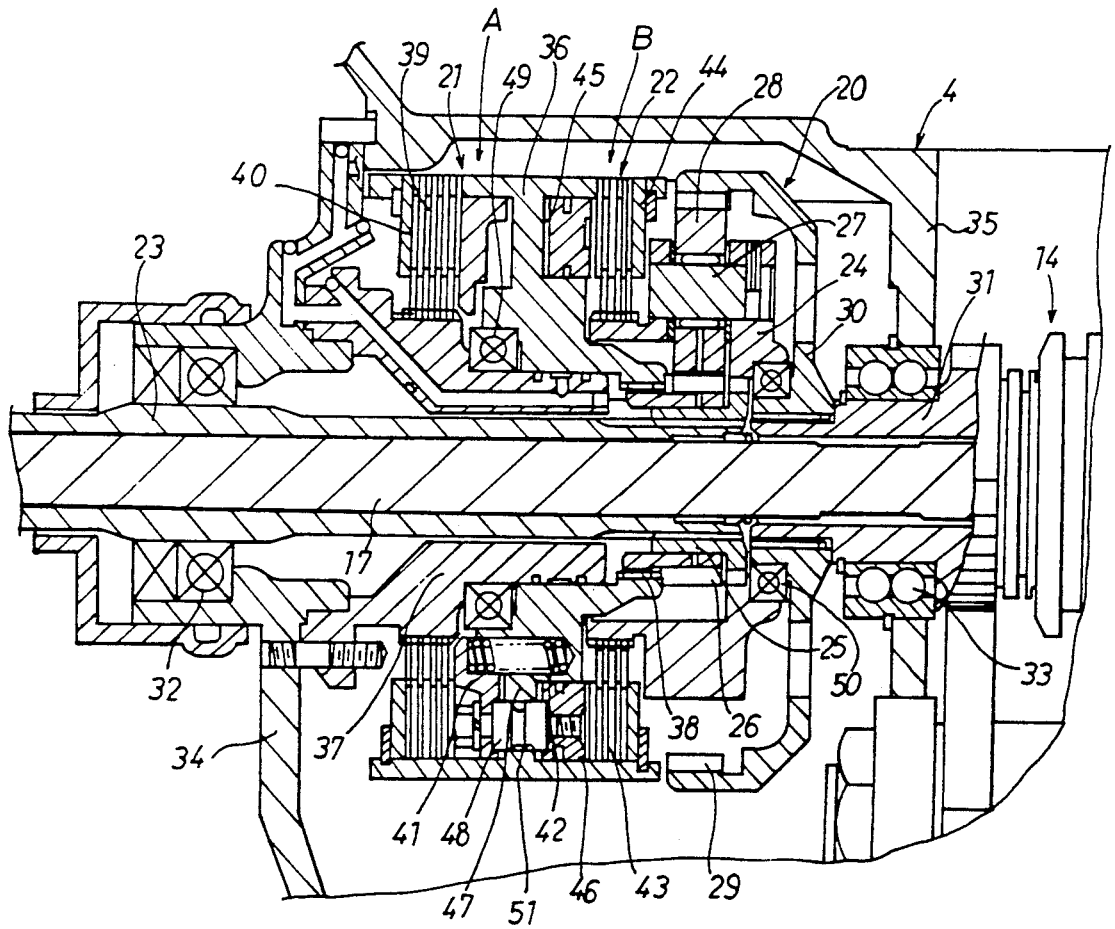

POWER TRANSMISSION FOR DRIVING VEHICLE

FIELD OF THE INVENTION AND RELATED ART STATEMENT

The present invention relates to power transmissions for driving tractors and like vehicles.

For use in vehicles such as tractors, U.S. Pat. No. 4,528,872, for example, discloses a two-step speed change apparatus disposed between an engine and a speed change mechanism. The apparatus is usually set to a high speed and is changed over to a low speed when the vehicle is overloaded.

The speed change apparatus has a high speed system for transmitting the rotation of the engine directly to the speed change mechanism, and a low speed system for transmitting the rotation to the speed change mechanism on a speed reduction by about 20%.

PROBLEMS TO BE SOLVED BY THE INVENTION

With the conventional speed change apparatus, the rotation of the engine is transmitted to the speed change mechanism as it is for high-speed driving or on speed reduction for low-speed driving, so that the overall torque transmitted is great. The gears of the speed change mechanism must therefore have an increased width. This increases the length of the mechanism, increasing the wheelbase of the vehicle. Consequently, the vehicle has a drawback wherein a large turning circle is required. Thus, the vehicle is unable to turn along a small circle. The vehicle, which is large-sized, also has the drawback of necessitating an increased manufacturing cost.

OBJECTS AND SUMMARY OF THE INVENTION

The present invention has been accomplished to solve the foregoing problems.

More specifically, a first object of the present invention is to provide a power transmission for driving vehicles wherein a reduced torque is transmitted to the speed change mechanism to permit use of gears of reduced width for the mechanism and which is thereby compact in its entirety.

A second object of the present invention is to provide a power transmission for driving vehicles which has incorporated therein high-low speed change means having a compact construction and comprising a planetary gear mechanism, speed increasing clutch and a direct coupling clutch.

A third object of the present invention is to provide a power transmission of the type mentioned wherein the speed increasing clutch and the direct coupling clutch are operatively connectable for a speed change and are thereby made compact in construction.

A fourth object of the present invention is to provide a power transmission of the type mentioned wherein when a hydraulic clutch is used as the direct coupling clutch, the working oil can be discharged from an oil chamber rapidly for a speed change so that the speed change can be effected smoothly and reliably.

The present invention provides a power transmission for driving a vehicle wherein high-low speed change means 13 is disposed between an engine 2 and a speed change mechanism 14, the high-low speed change means 13 comprising a speed increasing system A for transmitting the rotation of the engine to the speed change mechanism 14 on a speed increase, and a direct coupling system B for transmitting the rotation as it is to the speed change mechanism 14.

The high-low speed change means 13 comprises a planetary gear mechanism 20 provided between an input shaft 23 and an output shaft 31, a speed increasing clutch 21 for causing the planetary gear mechanism 20 to effect a speed increase, and a direct coupling clutch 22 for coupling the input shaft 23 to the output shaft 31 via the planeary gear mechanism 20 without a speed change.

A support case 37 fitting around the input shaft 23 is provided on a fixed member, and the speed increasing clutch 21 and the direct coupling clutch 22 are mounted on the support case 37 and arranged side by side axially of the shaft.

The planetary gear mechanism 20 comprises a planetary carrier 24 connected to the input shaft 23, a ring gear 29 connected to the output shaft 31, and a sun gear 26, the speed increasing clutch 21 is adapted to lock the sun gear 26. The sun gear 26 is connectable to the carrier 24 by the direct coupling clutch 22. The speed increasing clutch 21 and the direct coupling clutch 22 are arranged within a clutch body 36 on the respective axially opposite sides of a partition 47.

A connector 48 is inserted through a through bore 51 in the partition 47 slidably axially of the input shaft, and a pressure plate 41 of the speed increasing clutch 21 is connected to a piston 46 of the direct coupling clutch 22 by the connector 48. The pressure plate 41 is biased by a spring 42 toward the direction of engagement of the speed increasing clutch. The clutch body 36 is formed with a drain port 60 for releasing oil pressure from inside an oil chamber 45 to the outside therethrough.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a side elevation of a tractor;

FIG. 2 is a diagram showing the power transmission thereof;

FIG. 3 is a sectional view showing a high-low speed change means;

DESCRIPTION OF THE PREFERRED EMBODIMENTS

The present invention will be described below in greater detail with reference to the illustrated embodiments.

Figure 1:
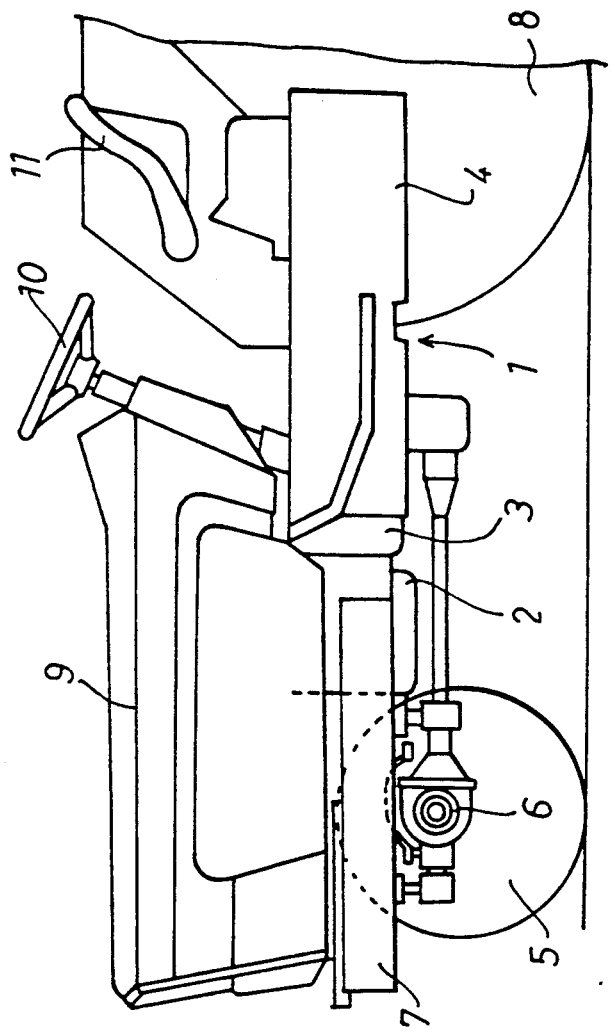
FIGS. 1 to 3 show a first embodiment of the invention.
Figure 2:
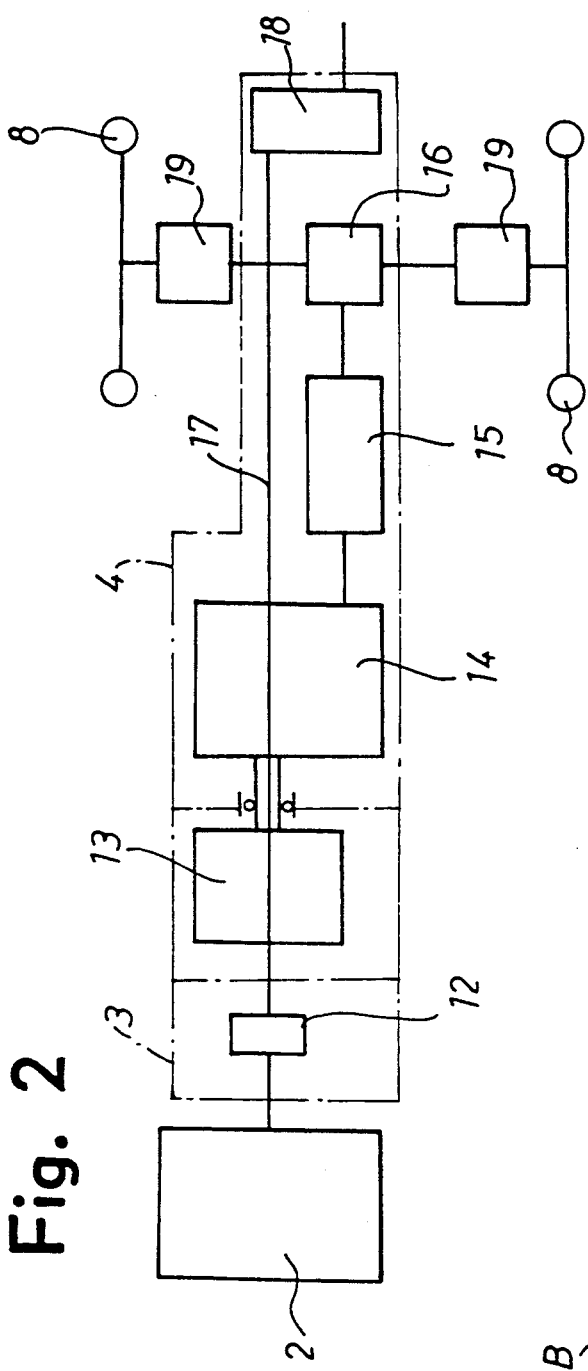
Figure 3:
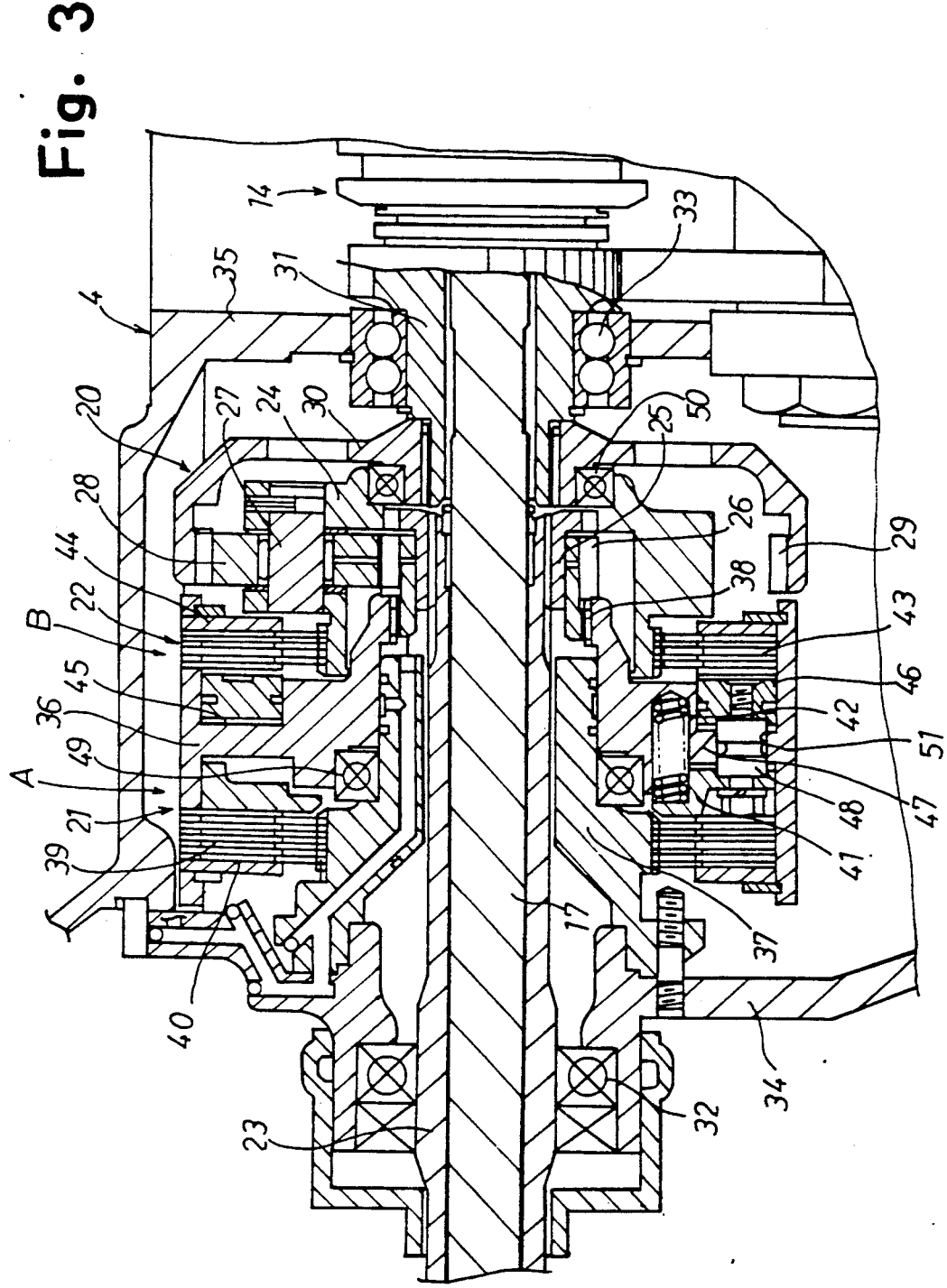

FIGS. 1 to 3 show a first embodiment of the present invention, i.e. a power transmission for driving a tractor.

With reference to FIG. 1, a tractor body 1 comprises an engine 2, clutch housing 3, transmission case 4, etc. Front wheels 5 are supported by a front axle case 6, etc. on a front axle frame 7 of the tractor body 1. The drawing further shows rear wheels 8, a bonnet 9, a steering wheel 10 and a driver's seat 11.

As seen in FIG. 2, the clutch housing 3 houses a main clutch 12 for effecting or interrupting transmission of the power of the engine 2. The transmission case 4 houses high-low speed change means 13, primary speed change mechanism 14, secondary speed change mechanism 15, rear wheel differential 16 and the like, i.e. a driving power transmission system. Also provided in the case 4 is a Power Take Off (PTO) system including a PTO transmission shaft 17, PTO speed change mechanism 18, etc. The rear wheel differential 16 is adapted to transmit the power to the opposed rear wheels 8 via terminal speed reduction mechanisms 19.

With reference to FIG. 3, the high-low speed change means 13 comprises a planetary gear mechanism 20, and a speed increasing clutch 21 and a direct coupling clutch 22 in combination with the mechanism 20. The speed change means 13 has a speed increasing system A for transmitting the rotation of the engine to the primary speed change mechanism 14 via the planetary gear mechanism 20 upon a speed increase when the speed increasing clutch 21 is engaged, and a direct coupling system B for transmitting the rotation as it is to the primary speed change mechanism 14 via the planetary gear mechanism 20 when the direct coupling clutch 22 is engaged.

The planetary gear mechanism 20 comprises a planetary carrier 24 splined to the rear end of an input shaft 23 connected to the main clutch 12, a sun gear 26 rotatably fitted around a boss portion 25 of the carrier 24, a plurality of planetary gears 28 each supported by a shaft 27 on the carrier 24 and meshing with the sun gear 26, and a ring gear 29 in mesh with the planetary gears 28. The ring gear 29 is integral with a flange 30, which in turn is splined to the front end of an output shaft 31 connected to the primary speed change mechanism 14. The input shaft 23 and the output shaft 31 are idly rotatably fitted around the PTO transmission shaft 17 and supported by bearings 32, 33 on a closure 34 of the transmission case 4 and a partition 35 inside the case 4.

The speed increasing clutch 21 is of the mechanical multiplate type, while the direct coupling clutch 22 is of the hydraulic multiplate type. These clutches are arranged side by side axially of the input shaft 23 and incorporated in a clutch body 36. The clutch body 36 is rotatably supported by a support case 37 and coupled to the sun gear 26 by a splined portion 38. The support case 37 is idly rotatably fitted around the input shaft 23 and fastened to the carrier 24. The clutch body 36 has approximately the same diameter as the planetary gear mechanism 20.

The speed increasing clutch 21 comprises a multiplicity of clutch plates 39 provided between the clutch body 36 and the support case 37, a bearing plate 40 secured to the clutch body 36, and a pressure plate 41 slidably fitted in the clutch body 36 for holding the clutch plates 39 between the bearing plate 40 and the pressure plate. The pressure plate 41 is biased by a spring 42 in a direction to press the clutch plates 39 against the bearing plate.

The direct coupling clutch 22 has a multiplicity of clutch plates 43 provided between the clutch body 36 and the carrier 24, a bearing plate 44 secured to the clutch body 36, and a piston 46 fitted in an oil chamber 45 of the clutch body 36 for holding the clutch plates 43 between the bearing plate 44 and the piston. The piston 46 is connected to the pressure plate 41 by a connector 48 inserted through a through bore 51 in a partition 47 of the clutch body 36 slidably axially of the input shaft. The pressure plate 41 and the piston 46 are slidable together by the pressure of working oil in the oil chamber 45 and the force of the spring 42. The speed increasing clutch 21 and the direct coupling clutch 22 are arranged on the respective sides of the partition 47, and the spring 42 is provided between the partition 47 and the pressure plate 41

In corresponding relation to the transmission of the engine rotation by the high-low speed change means 13 on a speed increase or without any speed change, the terminal speed reduction mechanisms 19 are set to a great reduction ratio. These reduction mechanisms 19 are of the planetary gear type.

With the above construction, the speed increasing clutch 21 is engaged in the usual mode of driving, whereby the rotation of the engine is increased in speed by about 30% by the speed increasing system A and transmitted to the primary speed change mechanism 14. When the supply of working oil to the oil chamber 45 is interrupted in this case, the spring 42 causes the pressure plate 41 to press the clutch plates 39 against the bearing plate 40, thus engaging the clutch 21 to fix the clutch body 36 to the support case 37, whereby the sun gear 26 of the planetary gear mechanism 20 is locked. Consequently, the planetary gears 28 on the carrier 24 rotating with the input shaft 23 revolve around the sun gear 26, driving the ring gear 29 at an increased speed and causing the ring gear 29 to rotate the output shaft 31 at a higher speed than the rotation of the engine.

If the vehicle is overloaded during running, the working oil is fed to the oil chamber 45 of the direct coupling clutch 22 to engage this clutch 22, with the result that the rotation of the engine is transmitted as it is to the primary speed change mechanism 14 by the direct coupling system B. Thus, the speed increasing system A is changed over to the direct coupling system B, whereby the increased number of revolutions of the output shaft 31 coupled to the primary speed change mechanism 14 is reduced by about 30% to mitigate the load on the engine. When the working oil is fed to the oil chamber 45 in this case, the piston 46 presses the clutch plates 43 against the bearing plate 44, thereby engaging the direct coupling clutch 22 and coupling the carrier 24 of the planetary gear mechanism 20 to the clutch body 36. This unites the carrier 24, sun gear 26, planetary gears 28 and ring gear 29, with the result that the rotation of the input shaft 23, i.e., the rotation of the engine, is transmitted as it is to the output shaft 31 for the primary speed change mechanism 14 via the planetary gear mechanism 20, permitting the output shaft 31 to rotate with the input shaft 23.

In this way, the engine power is delivered to the primary speed change mechanism 14 through the speed increasing system A or direct coupling system B to give a larger number of revolutions to the primary speed change mechanism 14 than conventionally, so that the torque transmitted to the mechanism 14 is correspondingly smaller. This permits use of a speed change mechanism or the like of lower horsepower with gears of reduced width, consequently making it possible to reduce the length of the primary speed change mechanism 14 and thereby shorten the wheelbase of the tractor body 1 to render the tractor turnable along a smaller circle and less costly to manufacture. Conversely if the wheelbase remains the same, an additional space becomes available in the transmission case 4 for accommodating other devices or means to give additional functions to the tractor.

The high-low speed change means 13 is compact because this means comprises the planetary gear mechanism 20, speed increasing clutch 21 and direct coupling clutch 22, with the two clutches 21, 22 incorporated in the clutch body 36 on the support case 37. Moreover, the pressure plate 41 of the speed increasing clutch 21 is coupled to the piston 46 of the direct coupling clutch 22 by the connector 48, and the spring 42 is provided between the pressure plate 41 and the partition 47. The direct coupling clutch 22 therefore need not be provided with a return spring or the like, hence a simplified construction.

Figure 4:
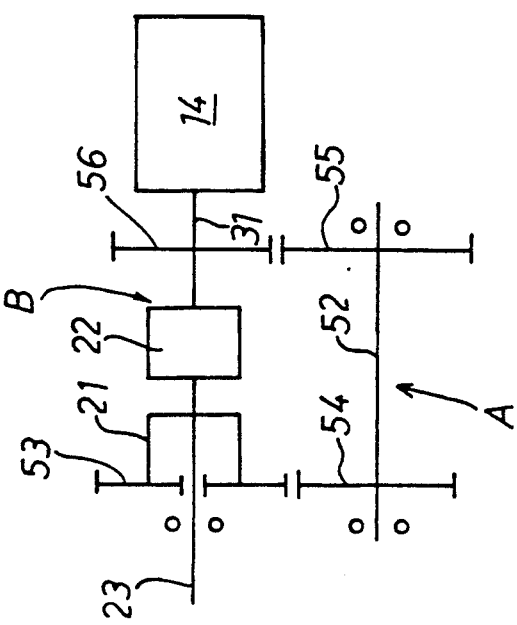
FIG. 4 is a diagram showing another high-low speed change means as a second embodiment of the invention.

FIG. 4 shows a second embodiment of the invention comprising a speed increasing system A which comprises trains of spur gears. More specifically, this embodiment comprises a shaft 52 in parallel to the input shaft 23 and the output shaft 31, a speed increasing clutch 21 and gear trains 53, 54 which are provided between the input shaft 23 and the shaft 52, and gear trains 55, 56 provided between the shaft 52 and the output shaft 31. A changeover between the speed increasing clutch 21 and the direct coupling clutch 22 also produces the same effect as already described.

When the oil chamber 45 is drained of the oil for a changeover from the direct coupling clutch 22 to the speed increasing clutch 21 in the case of the embodiment of FIG. 3, the sun gear 26 is uncoupled from the carrier 24. At this moment, the ring gear 29 is brought into a locked state, and the clutch body 36 is likely to rotate at a high speed with acceleration of the sun gear 26. A centrifugal force will then act on the oil within the oil chamber 45, preventing rapid discharge of the oil from the oil chamber 45 through an oil channel at the inner peripheral side of the chamber and leading to the likelihood that the speed increasing clutch 21 will not be engaged smoothly and reliably. Consequently the clutch plates 39 of the clutch 21, as well as those of the clutch 22, will slide relative to one another to wear and become less durable.

FIGS. 5 to 8 show a third embodiment which is desirable for draining the oil chamber 45 of the oil rapidly to assure a smooth changeover from the direct coupling clutch 22 to the speed increasing clutch 21.

Figure 5:
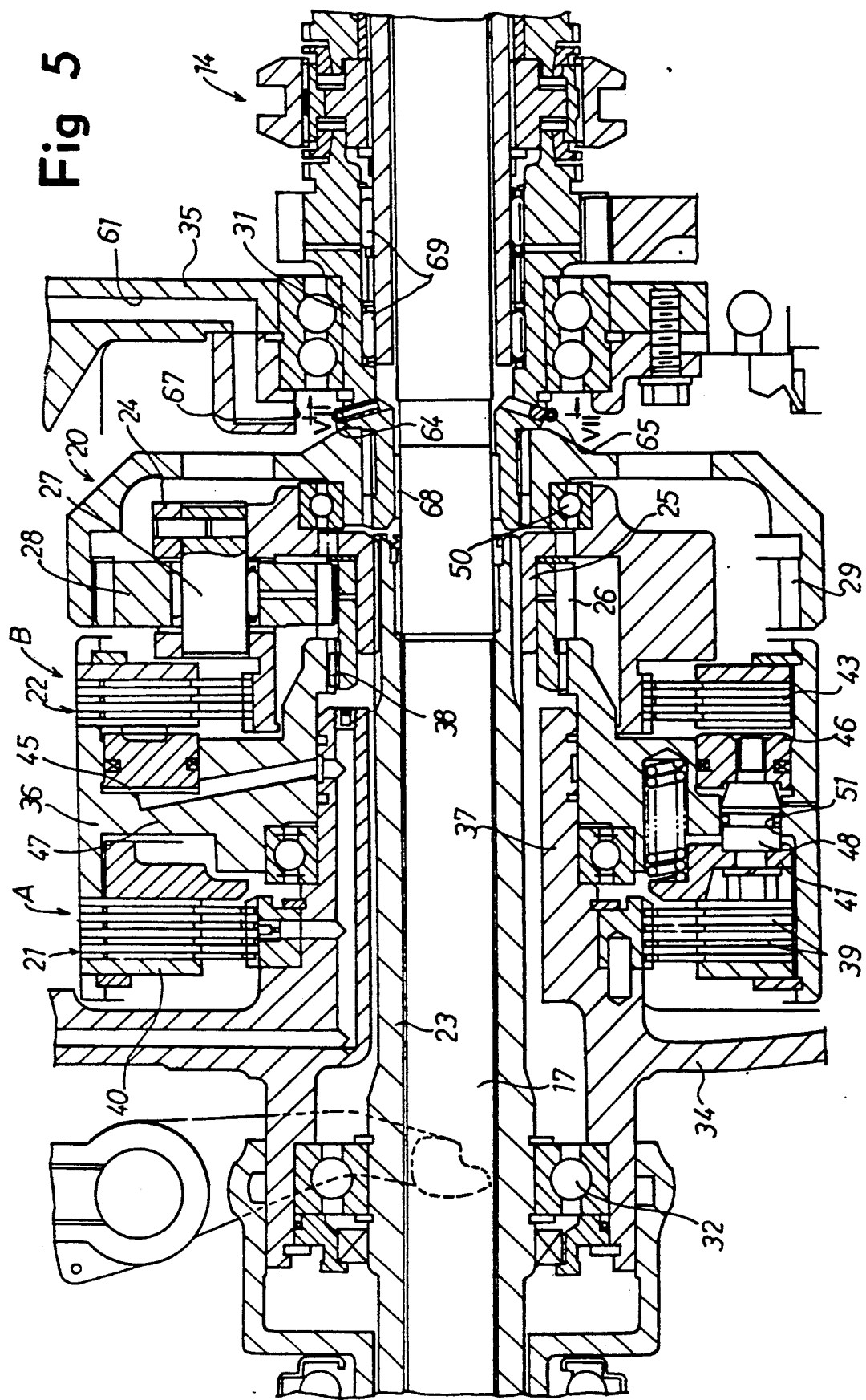
FIG. 5 is a sectional view showing another high-low speed change means as a third embodiment of the invention.
Figure 6:
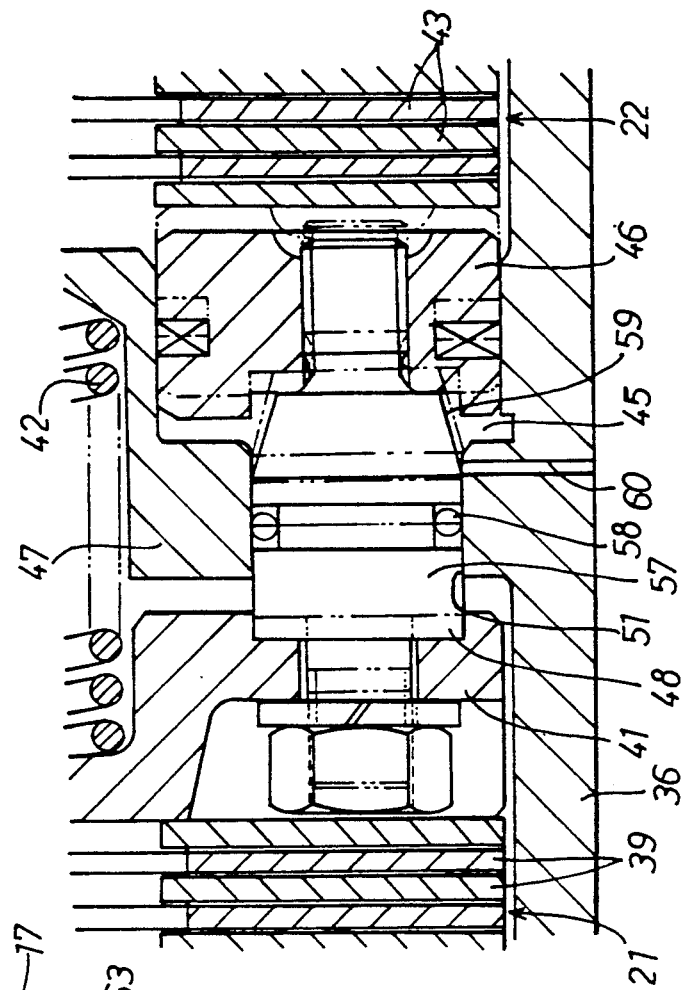
FIG. 6 is an enlarged fragmentary view in section of the same.

With reference to FIGS. 5 and 6, the partition 47 is provided with through bores 51, as well as connectors 48, at circumferentially different portions thereof, and each connector 48 has an O-ring 58 at an intermediate portion of its shank 57 which is slidable through the bore 51. The end of the shank 57 closer to the piston 46 has a portion 59 which is tapered toward the piston 46. The partition 47 is formed with a drain port 60 which is opened radially outwardly of the clutch body 36 from the inner periphery defining the through bore 51. The drain port 60 can be opened and closed by the axial movement of the connector 48. When the direct coupling clutch 22 is in its engaged state, the port 60 is closed with the shank 57 of the connector 48 as indicated in phantom line in FIG. 6. Alternatively when the speed increasing clutch 21 is engaged by the spring 42, the axial shift of the connector 48 positions the tapered portion 59 as opposed to the drain port 60, opening the port 60 as indicated in solid line in FIG. 6.

Figure 7:
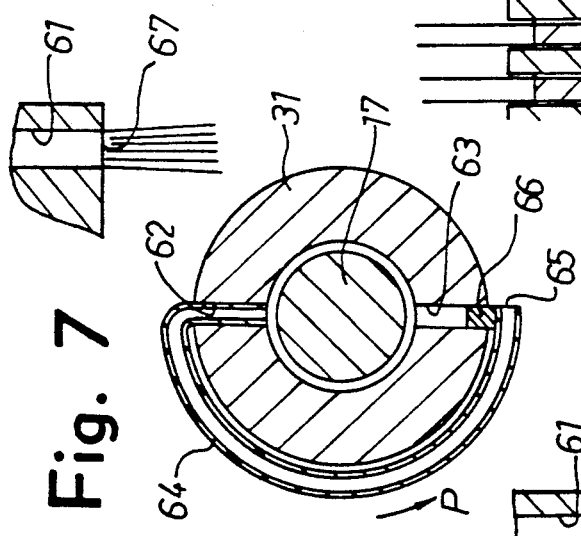
FIG. 7 is a view in section taken along the line VII—VII in FIG. 5.
Figure 8:
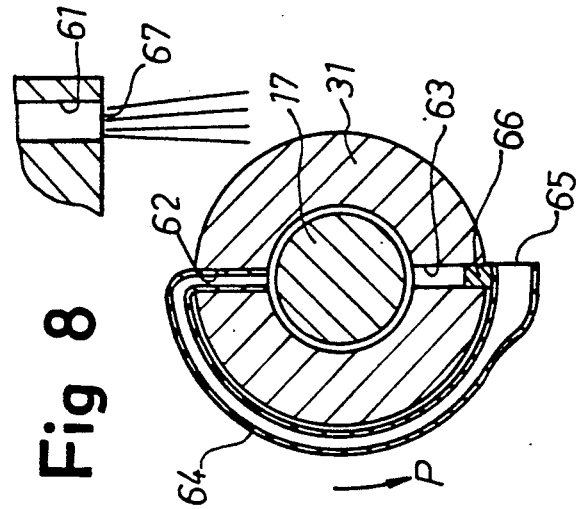
FIG. 8 is a sectional view showing a modification of the means of FIG. 7.

With reference to FIGS. 5, 7 and 8, the partition 35 disposed to the rear of the planetary gear mechanism 20 is formed with a drain oil channel 61 for guiding therethrough drain oil released from the hydraulic unit of the tractor. On the other hand, the output shaft 31 has a pair of lubrication bores 62, 63. A lubrication pipe 64 has one end fitted in one of these bores, 62, and the other end oriented toward the direction P of rotation of the output shaft 31 and left open as at 65. A plug 66 secured to the outer surface of the other end of the pipe 64 is fitted in the other lubrication bore 63 to close the bore. As seen in FIG. 7, the drain oil channel 61 has an outlet 67 which is disposed at one side of and above the shaft 31 and opposed to the path of rotation of the opening 65 of the pipe 64. During the rotation of the output shaft 31, the drain oil is admitted into the lubrication pipe 64 through its opening 65 and guided to the clearance between the output shaft 31 and the PTO transmission shaft 17 to effectively lubricate front and rear bearings 68, 69 supporting the output shaft 31.

As seen in FIG. 8, the opening portion 65 may have an enlarged circular cross section to admit the oil thereinto more smoothly. The drain outlet 67 may be disposed immediately above the axis of the output shaft 31.

For a changeover from the direct coupling clutch 22 to the speed increasing clutch 21, the supply of oil pressure to the clutch 22 is interruped, whereby the clutch plates 43 are relieved of the pressure applied by the piston 46, permitting the spring 42 to shift the pressure plate 41 in the direction to press the clutch plates 39. At this time, the piston 46 also moves with the pressure plate 41 to disengage the direct coupling clutch 22. The ring gear 29 is therefore locked, and the sun gear 26 is accelerated to rotate the clutch body 36 at a high speed. Since the drain port 60 which has been closed with the shank 57 of the connector 48 is opened at this time, the oil remaining in the oil chamber 45 is rapidly centrifugally discharged from the clutch body 36 through the drain port 60. This returns the piston 46 smoothly, permitting the pressure plate 41 to press the clutch plates 39 under the action of the spring 42. Consequently, the speed increasing clutch 21 is smoothly engaged to fix the clutch body 36 to the support case 37. The sun gear 26 is locked, with the result that the power of the input shaft 23 is transmitted through the carrier 24, planetary gears 28 and ring gear 29 to the output shaft 31 on a speed increase. Because the speed increasing clutch 21 can be engaged smoothly, the clutch plates 39, as well as the clutch plates 43, are effectively prevented from sliding relative to one another and therefore from wear, hence improved durability.

Figure 9:
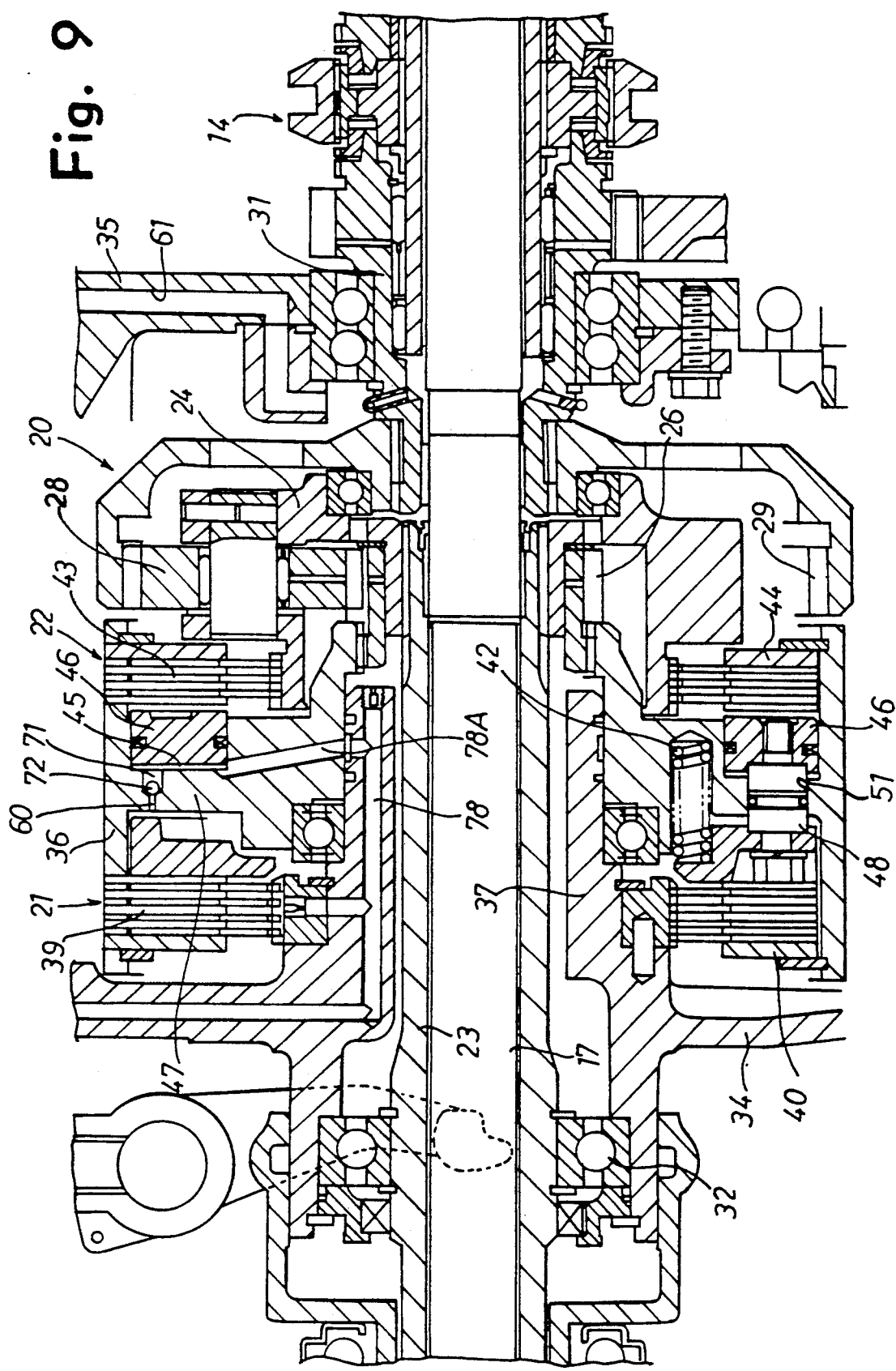
FIG. 9 is a sectional view showing another high-low speed change means as a fourth embodiment of the invention.
Figure 10:
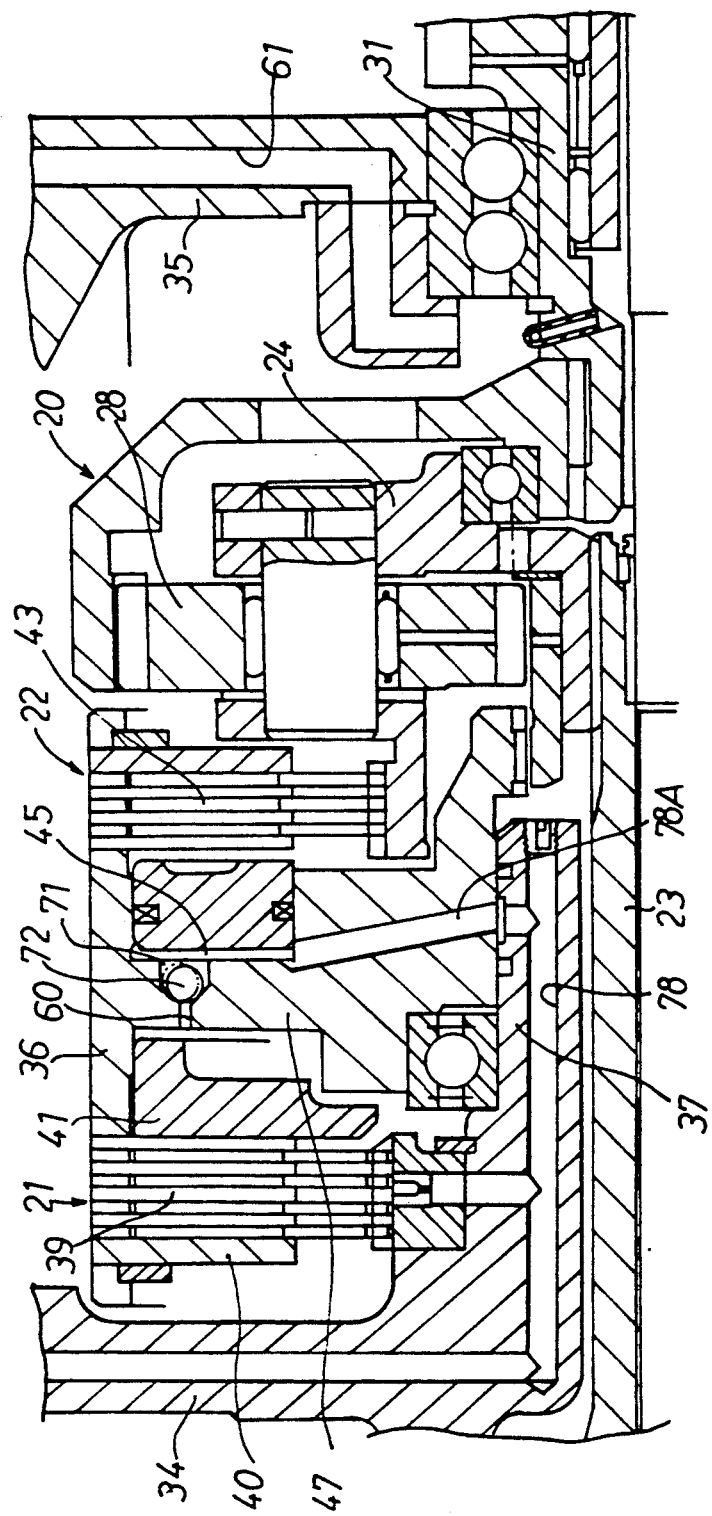
FIG. 10 is an enlarged fragmentary view in section of the same.

FIGS. 9 and 10 show a fourth embodiment of the invention, in which the partition wall 47 has a drain port 60 extending axially of the input shaft 23 and communicating with the oil chamber 45. The drain port 60 has a cavity 71 having a ball valve 72 accommodated therein.

When the pressure oil is supplied to the oil chamber 45 through an oil channel 78, the ball valve 72 closes the drain port 60. When the oil chamber 45 is relieved of the oil pressure, the ball valve 72 moves radially outward of the clutch body 36 by being subjected to a centrifugal force due to the rotation of the body 36 to open the drain port 60. Accordingly, when the drain port 60 is opened by the ball valve 72, the oil chamber 45 communicates with the atmosphere via the drain port 60, with the result that the oil which will not flow out of an oil channel 78A is rapidly discharged through the port 60. The drain port 60 may be inclined to allow the oil to be discharged centrifugally.

Figure 11:
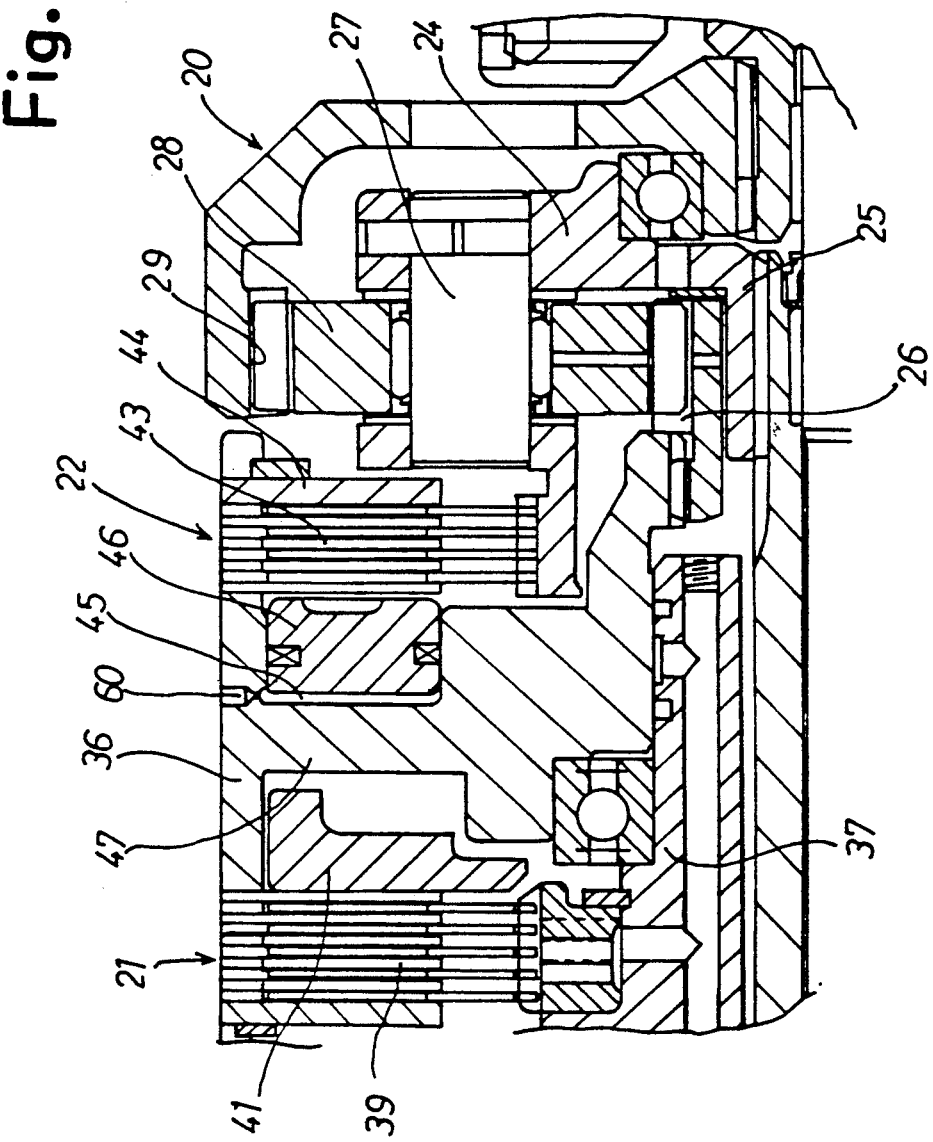
FIG. 11 is a sectional view showing another high-low speed change means as a fifth embodiment of the invention.

FIG. 11 shows a fifth embodiment of the present invention, in which a constricted drain port 60 extends from the oil chamber 45 radially outwardly of the clutch body 36. In this case, the pressure oil flows out via the drain port 60 in a small amount at all times even during the engagement of the direct coupling clutch 22. To disengage the clutch 22, the supply of pressure oil to the oil chamber 45 is interruped, permitting the oil inside the chamber 45 to rapidly flow out through the port 60. Accordingly, a valve or the like can be dispensed with, whereas the same effect as already described can be achieved by this embodiment which is most simplified in construction. The drain port 60 is one in number.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Vehicular power transmission system comprising:
   a high/low speed change means (13) operatively positioned between an engine (2) and a speed change mechanism (14);
   said high/low speed change means (13) including a speed up line (A) having a speed up clutch (21) for transmitting overdriven engine rotations to the speed change mechanism (14) and a direct connection line (B) having a direct connection clutch (22) for transmitting unchanged engine rotations to the speed change mechanism (14);
   said speed up clutch (21) and direct connection clutch (22) being arranged axially at opposite sides of a partition wall (47) formed in a clutch body (36) rotatably positioned on a support case (37) for surrounding an input shaft (23);
   a pressure plate (41) of the speed up clutch (21) and a piston (46) of the direct connection clutch (22) operatively connected by an axially slidable connector (48) which penetrates through a through bore (51) formed in the partition wall (47);
   a spring (42) disposed between said partition wall (47) and said pressure plate (41) for urging the pressure plate (41) to be accessible to engage the speed up clutch (21);
   an oil chamber (45) formed in the clutch body (36) for effecting an oil pressure on the piston (46) to be accessible to engage the direct clutch (22), wherein the oil pressure exerts a force on the piston in an opposite direction as the force exerted by said spring on the pressure plate with; and
   a drain port (60) being formed in the clutch body (36) for releasing oil pressure in the oil chamber (45) to the exterior of the oil chamber.

2. Vehicular power transmission system according to claim 1 wherein a planetary gear system (20) is comprised in the high/low speed change means (13) and is disposed between the input shaft (23) and an output shaft (31), and said speed up line (A) comprises said planetary gear system (20) and the speed up clutch (21), said direct connection line (B) includes the planetary gear system (20) and the direct connection clutch (22) for connecting the input shaft (23) with the output shaft (31) via the planetary gear system (20).

3. Vehicular power transmission system according to claim 1, wherein a support case (37) surrounding the input shaft (23) is secured to a transmission case (4), and the speed up clutch (21) and the direct connection clutch (22) are disposed axially on said support case (37).

4. Vehicular power transmission system according to claim 2, wherein the planetary gear system (20) and the clutch body (36) have approximately the same diameter.

5. Vehicular power transmission system according to claim 2, wherein the planetary gear system (20) comprises a planetary carrier (24) connected to the input shaft (23) and a ring gear (29) connected to the output shaft (31), wherein the speed up clutch (21) is adapted to stop a sun gear (26) and the direct connection clutch (22) is adapted to connect the sun gear (26) with the planetary carrier (24).

6. Vehicular power transmission system according to claim 1, wherein said drain port (60) extends from an oil chamber (45) radially outwardly of the clutch body (36).

7. Vehicular power transmission system according to claim 1, wherein the drain port (60) is adapted to open/close by axial movement of the axially slidable connector (48) and is open when the speed up clutch is engaged.

8. Vehicular power transmission system according to claim 1, wherein the drain port (60) is formed to extend from inside of the through bore (51) radially outwardly of the clutch body (36).

9. Vehicular power transmission system according to claim 1, wherein the axially slidable connector (48) has a tapered portion for opening the drain port (60).

10. Vehicular power transmission system according to claim 1, wherein the drain port (60) is formed through the partition wall (47) and is provided with a valve (72) for closing the drain port (60) when an internal oil pressure of the oil chamber (47) builds up or for opening the drain port (60) when the internal oil pressure decreases.

11. Vehicular power transmission system according to claim 10, wherein the valve (72) is adapted to open the drain port (60) by centrifugal force.

12. Vehicular power transmission system according to claim 10 or 11, wherein the partition wall (47) is formed with a cavity (71) to communicate with the drain port (60), and further including a ball valve operatively positioned within the cavity (71).

* * * * *